United States Patent
Battle et al.

(10) Patent No.: US 11,068,267 B2
(45) Date of Patent: Jul. 20, 2021

(54) HIGH BANDWIDTH LOGICAL REGISTER FLUSH RECOVERY

(71) Applicant: International Business Machines Corporation, Armonk, NY (US)

(72) Inventors: Steven J. Battle, Austin, TX (US); Brandon Goddard, Kirkland, WA (US); Dung Q. Nguyen, Austin, TX (US); Joshua W. Bowman, Austin, TX (US); Brian D. Barrick, Pflugerville, TX (US); Susan Eisen, Round Rock, TX (US); Salma Ayub, Austin, TX (US); Christopher M. Mueller, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/392,722

(22) Filed: Apr. 24, 2019

(65) Prior Publication Data
US 2020/0341767 A1 Oct. 29, 2020

(51) Int. Cl.
*G06F 9/30* (2018.01)
*G06F 9/48* (2006.01)
*G06F 11/14* (2006.01)

(52) U.S. Cl.
CPC ...... *G06F 9/30141* (2013.01); *G06F 9/30123* (2013.01); *G06F 9/4881* (2013.01); *G06F 11/1469* (2013.01); *G06F 11/1471* (2013.01)

(58) Field of Classification Search
None
See application file for complete search history.

(56) References Cited

U.S. PATENT DOCUMENTS

| 4,268,904 | A | * | 5/1981 | Suzuki | G06F 9/4812 710/40 |
|---|---|---|---|---|---|
| 5,644,742 | A | * | 7/1997 | Shen | G06F 9/3004 712/244 |
| 6,941,489 | B2 | * | 9/2005 | DeLano | G06F 11/1405 714/10 |
| 7,996,663 | B2 | | 8/2011 | Stillwell, Jr. et al. | |
| 2017/0109166 | A1 | * | 4/2017 | Eisen | G06F 9/3891 |
| 2017/0262286 | A1 | * | 9/2017 | Hickerson | G06F 9/3802 |

* cited by examiner

*Primary Examiner* — John M Lindlof
(74) *Attorney, Agent, or Firm* — Cantor Colburn LLP; Bryan Bortnick

(57) ABSTRACT

An aspect includes receiving a flush request at a processing unit that is in a current state defined by contents of registers in a register file. The processing unit includes a plurality of slices and the flush request includes an identifier of a previously issued instruction. The processing unit is restored to a previous state defined by contents of the registers in the register file prior to the previously issued instruction being issued. The restoring includes searching previous state buffers in at least two of the plurality of slices to locate data describing the contents of the registers in the register file prior to the previously issued instruction being issued. The restoring also includes combining the located data to generate results of the searching and updating the contents of the registers in the register file using a single port based at least in part on the results.

20 Claims, 6 Drawing Sheets

HIGH BANDWIDTH LOGICAL REGISTER FLUSH RECOVERY

BACKGROUND

The present invention relates generally to logical register (LREG) flush recovery in a computer system, and more specifically to high bandwidth LREG flush recovery from a save and restore buffer (SRB) in a computer system.

SUMMARY

Embodiments include a method, system, and computer program product for high bandwidth logical register flush recovery. A method includes receiving a flush request at a processing unit that is in a current state defined by contents of registers in a register file. The processing unit includes a plurality of slices and the flush request includes an identifier of a previously issued instruction. The processing unit is restored to a previous state defined by contents of the registers in the register file prior to the previously issued instruction being issued. The restoring includes searching previous state buffers in at least two of the plurality of slices to locate data describing the contents of the registers in the register file prior to the previously issued instruction being issued. The restoring also includes combining the located data to generate results of the searching and updating the contents of the registers in the register file based at least in part on the results. The updating is via a single port into the register file.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

One or more embodiments of the present invention provide high bandwidth logical register (LREG) flush recovery from a save and restore buffer (SRB) in a microprocessor. When a flush occurs due, for example, to a branch misprediction or an exception, the dispatching of new instructions is stalled while the LREG mapper state recovers back to the values prior to the flush instruction tag (ITAG). The SRB processes the flush ITAG and recovers the correct LREG state back to the mapper.

In the "dispatch" stage, the decoded instruction is dispatched to an issue queue (ISQ) where instructions wait for operand source data and an available execution unit. The instruction operand LREG sources are read from the LREG mapper, and the source information, i.e. whether the source has data ready or not, is provided to the ISQ. The mapper assigns a physical register destination in the slice-target file to store the result of the instruction. The previous mapping and new mapping of the destination LREG is evicted to the SRB as a pair. If the new instruction is flushed, the prior mapping is restored back to the mapper In contemporary multi-slice processor cores, recovery ports on the SRB are fixed to each slice. Thus, if one slice has many LREGs to recover and the other none, one recovery port remains idle during the recovery process, resulting in wasted bandwidth during the recovery operations.

In accordance with one or more embodiments of the present invention, recovery bandwidth is shared within a super slice (e.g., contains two slices). In addition, in accordance with one or more embodiments of the present invention, recovery latency is not affected by dispatch biasing into particular slices, that is, there is no penalty if one slice within the super slice has more LREGs to recover than the other slice within the super slice. One or more embodiments of the present invention decouple the recovery ports from a specific slice lookup and add multiplexors to choose among the various lookups which allows the ports to be shared. This can result in shortening the recovery time and a reduction in the amount of time that the dispatching is stalled for recovery operations.

In order to reduce the amount of multiplexing, one or more embodiments of the present invention tie the ports to quadrants of the SRB. In addition, the SRB entry allocation logic can steer entries to the top or bottom of the slice to ensure that each thread's general-purpose registers (GPRs) and vector-scalar registers (VSRs) are spread across the slice, rather than clustered in one part of the slice. This ensures that each port lookup will have the maximum chance of finding recovery entries without an individual port having to look across all entries.

Figure 1:
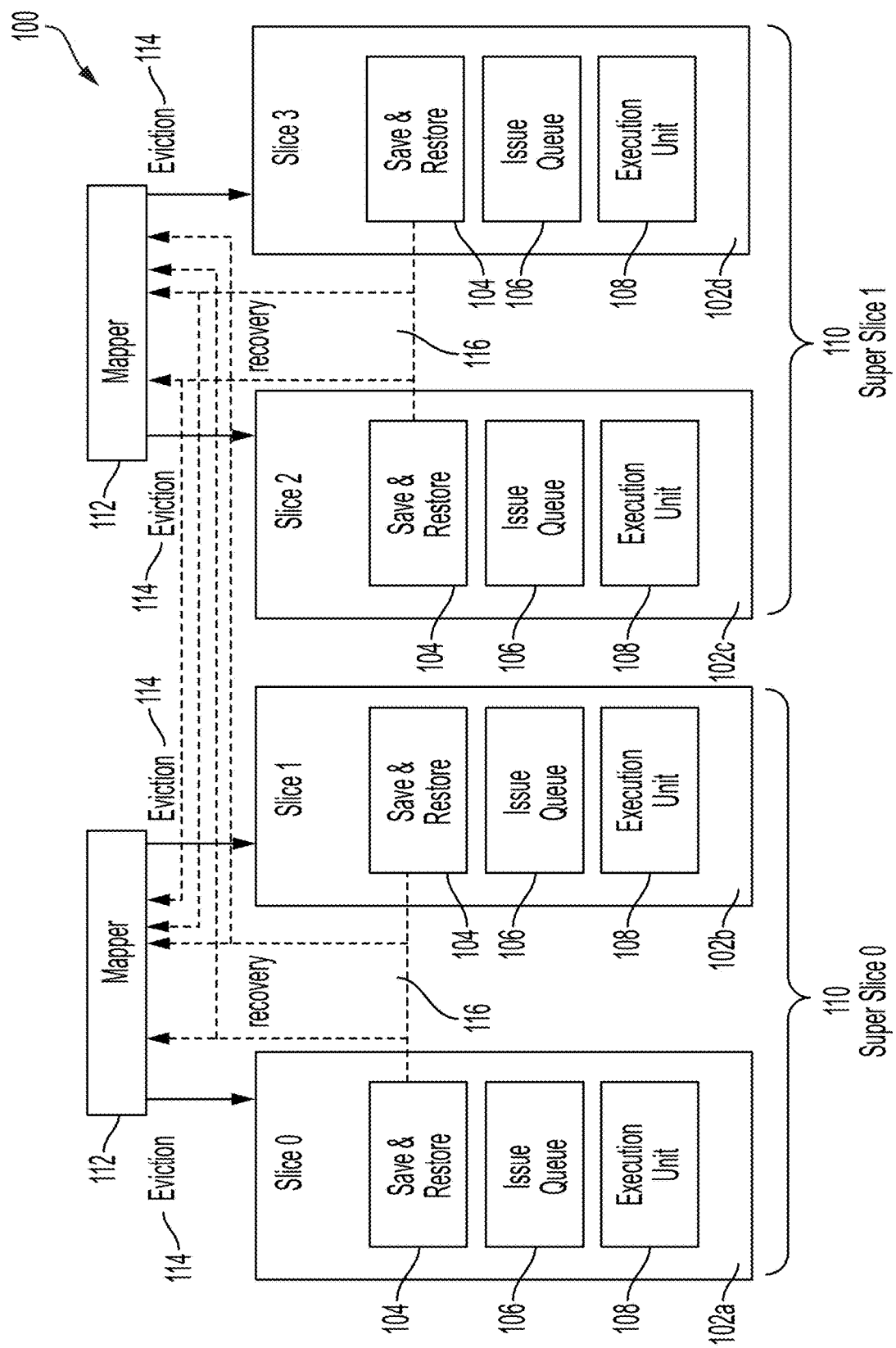
FIG. 1 illustrates a block diagram of components of a processing unit for logical register (LREG) flush recovery.

Turning now to FIG. 1, a block diagram 100 of components of a processing unit for logical register (LREG) flush recovery is generally shown. As used herein, the term LREG flush recovery refers to the process of restoring the logical to physical register mappings from the SRB into the LREG mapper following a flush (e.g. due to branch mispredict, cache miss, or other exception case).

One or more embodiments of the present invention execute on a slice multi-core (SMC) processor which is partitioned into slices according to whether the processor is executing in single-thread (ST) mode, or in one of various simultaneous multi-thread modes (e.g., SMT2, SMT4, etc.). Each core can be broken up into four slices and a pair of slices is referred to as a "super slice." As shown in FIG. 1, slice 102a and slice 102b are paired together to form a super slice 110 labeled "Super slice 0", and slice 102c and slice 102d are paired together to form a super slice 110 labeled "Super slice 1."

The components shown in FIG. 1 also include an ISQ 106 and an execution unit in each slice 102. As is known in the art, an instruction is dispatched to an ISQ 106 and once all of the dependencies for an instruction in the ISQ 106 have been satisfied, the instruction can be issued to an execution unit 108 for execution of the instruction. When an instruction is dispatched to the ISQ 106, the LREG mapper 112 is read to determine where the data required by the instruction is located. When a new instruction is dispatched to the ISQ 106, the contents of the LREG mapper 112 are saved in the SRB 104 for the previous instruction.

The components shown in FIG. 1 include LREG mappers 112 in communication with slices 102a 102b 102c 102d which are referred to herein collectively as slices 102. The LREG mappers 112 define a current state of the processor and contain an entry for each logical register defined in the processor architecture. This mapping includes the instruction tag (ITAG) of the instruction producing the result. The mapper also includes a 'ready' bit indicating if the instruction has executed and the data is ready in the register file array. The SMC processor shown in FIG. 1 also includes a save and restore buffer (SRB) 104 which stores entries that represent a previous (e.g., evicted) state of the logical register (LREG) mapper 112. In accordance with one or more embodiments of the present invention, each entry in the SRB 104 contains a pair of mapper entries, the evicted entry and the evictor entry. Each SRB entry includes an evicted instruction tag (ITAG), a slice target file tag (STF tag) pointer for the evicted instruction, and the ITAG of the evictor instruction, and the STF tag of the evictor instruction. The ITAG is a number given to every instruction that is fetched. Every time that a new instruction is added to the ISQ 106, the contents of the destination LREG mapper entry in the LREG mapper 112 are stored as an entry in the SRB 104. The slice target file tag (STF tag) pointer corresponds to an entry in the register file. In accordance with one or more embodiments of the present invention, each entry in the SRB 104 contains the above fields along with a valid bit to indicate if the entry is valid.

FIG. 1 also depicts eviction paths 114 from the mappers 112 to the SRBs 104 for moving the current state of a mapper 112 to an SRB 104. In addition, FIG. 1 depicts recovery paths 116 to the mappers 112 from the SRBs 104 for moving a previous state of a mapper 112 stored as an entry in an SRB 104 into a mapper 112. As shown in FIG. 1, there is one fixed recovery path 116 (or port) for each of the slices 102, and each of the mappers 112 snoop the recovery paths 116 (shown as the dashed lines) to stay synchronized and ensure that the LREGs are updated correctly.

Figure 2:
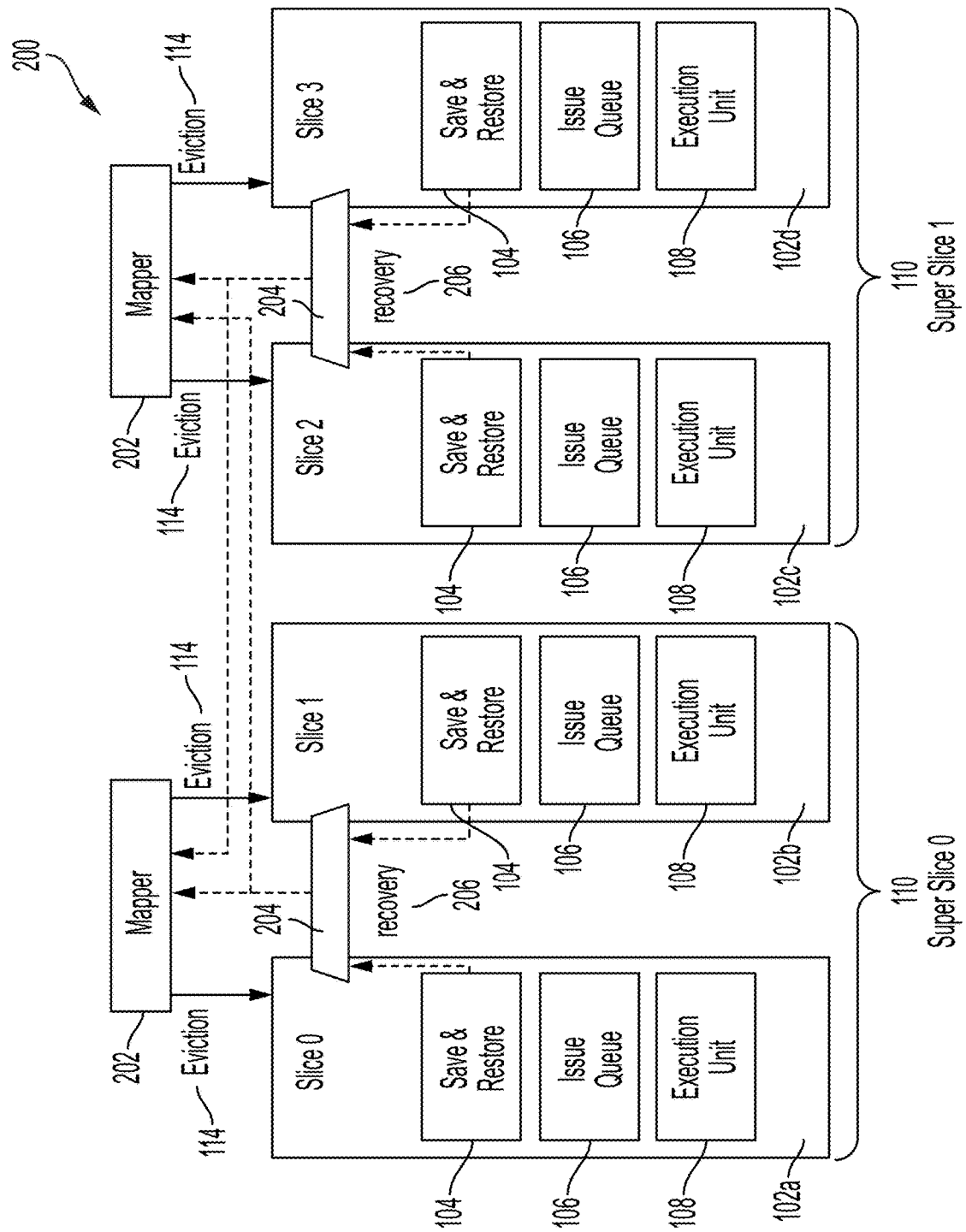
FIG. 2 illustrates a block diagram of components of a processing unit for LREG flush recovery in accordance with one or more embodiments of the present invention.
Figure 3:
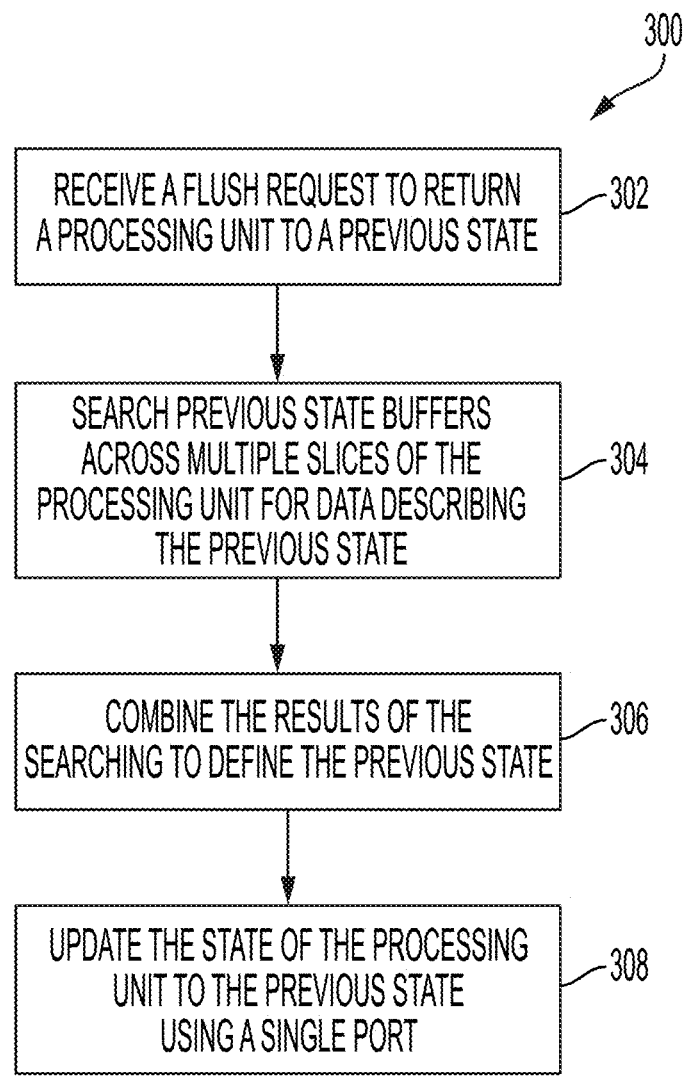
FIG. 3 illustrates a flow diagram of a process for LREG flush recovery in accordance with one or more embodiments of the present invention.

Turning now to FIG. 2, a block diagram 200 of components of a processing unit for LREG flush recovery is generally shown in accordance with one or more embodiments of the present invention. The processing unit shown in FIG. 2 is similar to that described previously with respect to FIG. 1 however, both of the recovery paths 206 for a pair of slices 102 within a super slice are input to a multiplexor 204 which is then input via a single port to the LREG mapper 202. The embodiment shown in FIG. 2 allows a slice to be restored using all the restore ports in the super slice. This is contrasted with the design shown in FIG. 1 where an SRB can only use the restore ports attached to its own slice. The embodiment shown in FIG. 2 will have a shorter flush latency because if slice 1 102b in a super slice 110 does not have any entries to restore, then the port can be used by slice 0 102a, effectively doubling its bandwidth Turning now to FIG. 3, a flow diagram 300 of a process for LREG flush recovery is generally shown in accordance with one or more embodiments of the present invention. The processing shown in FIG. 3 can be performed, for example, by the processing unit shown in FIG. 2. At block 302, a flush request is received at a processing unit that is in a current state as defined by contents of registers in a register file stored, for example in LREG mapper 202 of FIG. 2. The flush request includes an identifier (e.g., an ITAG) of a previously issued instruction. At blocks 304 through 308, the processing unit is restored to a previous state defined by the contents of the registers in the register file prior to the previously issued instruction being issued. At block 304, previous state buffers, such as SRBs 104 of FIG. 2, in at least two of the plurality of slices are searched for data describing the contents of the registers in the register file prior to the previously issued instruction being issued. At block 306, the results of the searching are combined using, for example, multiplexor 204 of FIG. 2, to define the previous state. At block 308, the state of the processing unit is updated, for example by updating LREG mapper 202 of FIG. 2, to the previous state using a single port, or data path, into the mapper.

Figure 4:
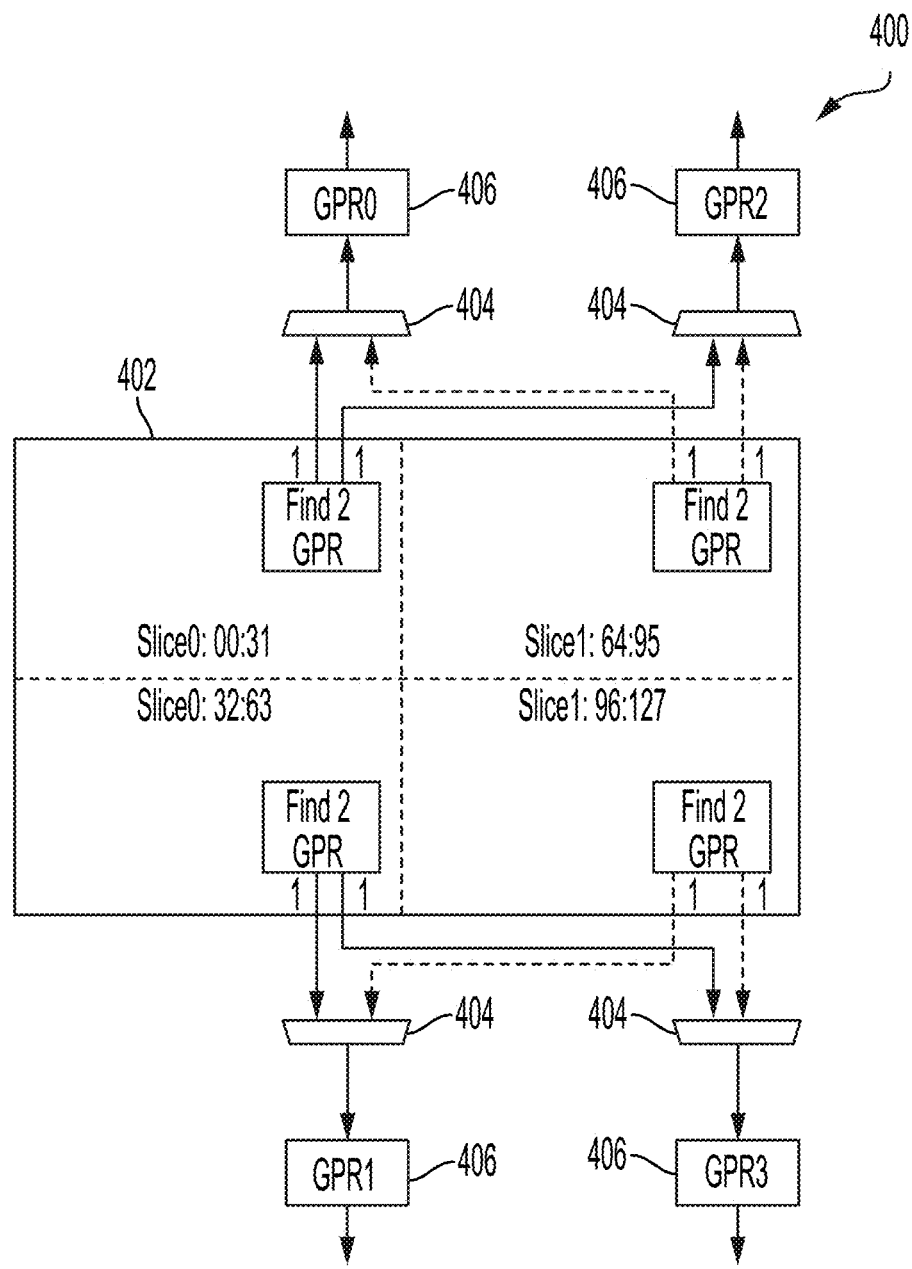
FIG. 4 illustrates a block diagram of components of a quadrant lookup in accordance with one or more embodiments of the present invention.

Turning now to FIG. 4, a block diagram 400 of components of a quadrant lookup is generally shown in accordance with one or more embodiments of the present invention. The block diagram 400 includes an SRB 402 having entries broken up into four quadrants: Slice 0: entries 00:31; Slice 0: entries 32:63; Slice 1: entries 64:95; and Slice 1: entries 96:127. The SRB 402 depicted in FIG. 4 combines two of the SRBs 104 shown in FIG. 2 that each cover one slice 102 into a single SRB 402 that covers two slices 102. As shown in FIG. 4, the ports 406 labeled "GPR0" and "GPR2" are for the top half of Slice 0 and Slice 1, and the ports 406 labeled "GPR1" and "GPR3" are for the bottom half of Slice 0 and Slice 1. The embodiment shown in FIG. 4 can allow four entries to be recovered in each cycle, regardless of whether all four entries are in Slice 0, are in Slice 1, or are spread across Slices 0 and 1. In the embodiment shown in FIG. 4, 4 ports 406 are available to Slices 0 and 1. The ports 406 are partitioned such that 2 ports 406 are connected via multiplexor 404 to the "top" half and 2 ports 406 to the "bottom" half. To fully populate each pair of ports 406, each slice 102 will attempt to find 2 entries to recover per "half" for a total of 4 per slice 102. If Slice 0 has finished recovery, but Slice 1 still has entries, the additional lookup hardware tells the multiplexors 404 to select Slice 1 as the port input.

Figure 5:
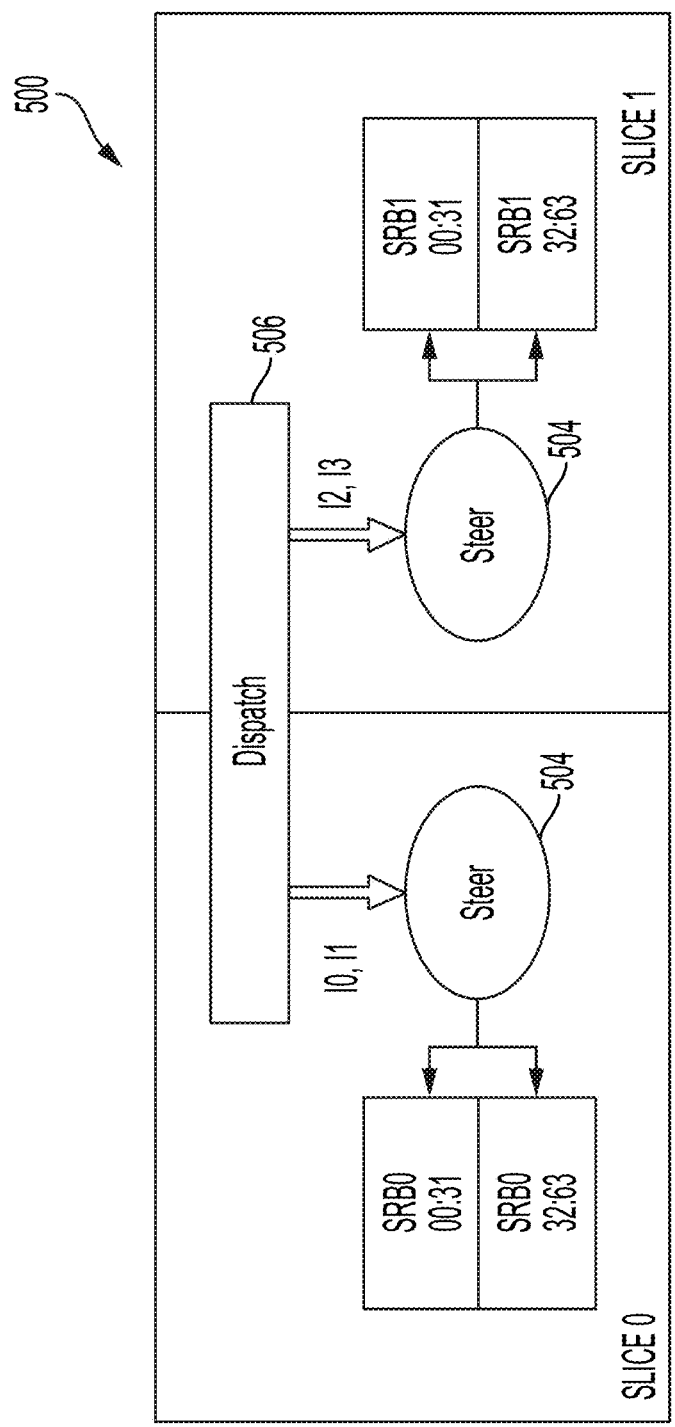
FIG. 5 illustrates a block diagram of components of a system for allocating entries in a previous state buffer in accordance with one or more embodiments of the present invention.

Turning now to FIG. 5, a block diagram 500 of components of a system for allocating entries in a previous state buffer is generally shown in accordance with one or more embodiments of the present invention. As shown in FIG. 5, upon dispatch 506 of an instruction, the SRB entry is steered 504 to particular entries in the SRB. This can be used to spread the contents across the quadrants shown in FIG. 4.

Figure 6:
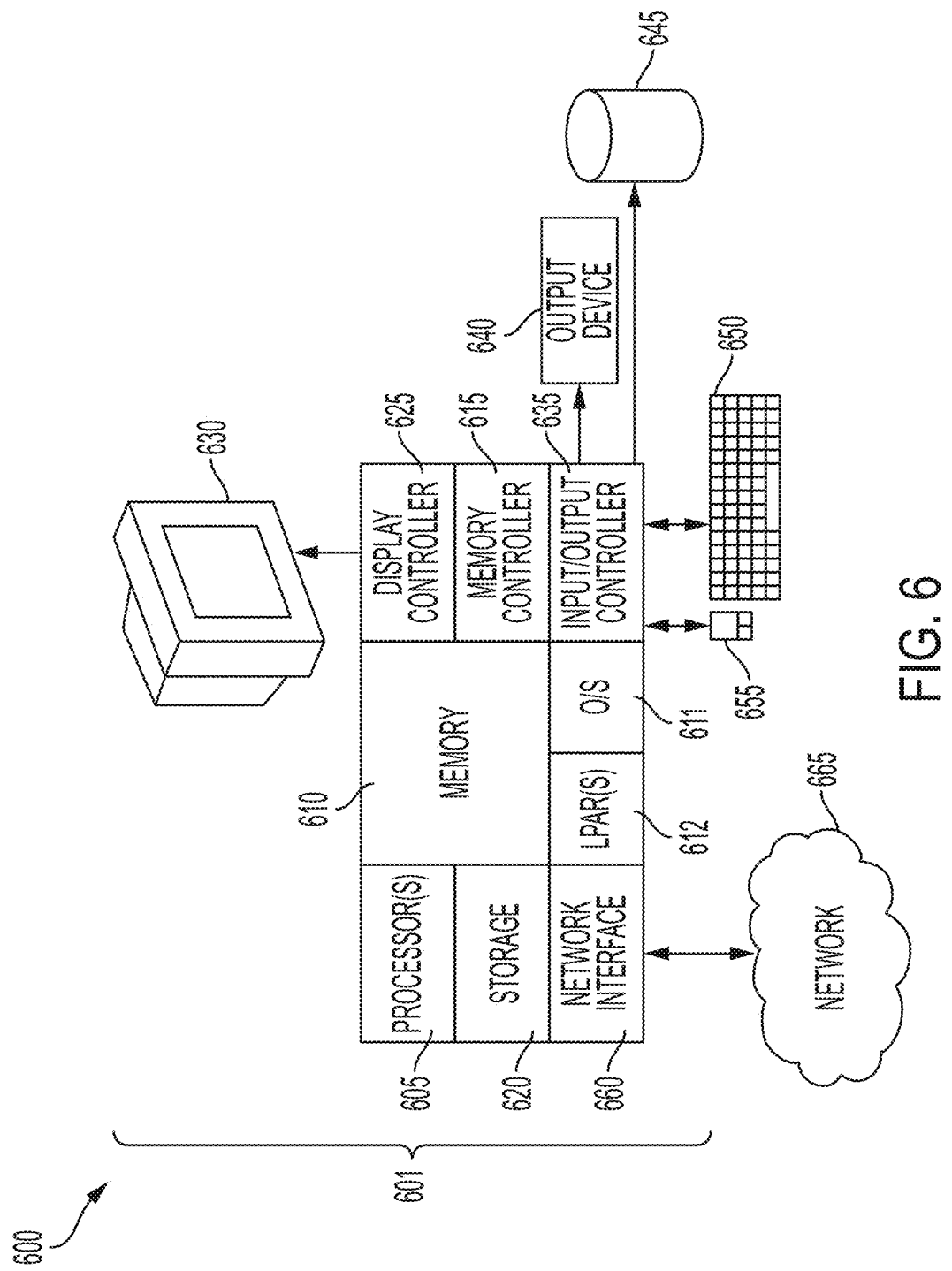
FIG. 6 illustrates a computer system for LREG flush recovery in accordance with one or more embodiments of the present invention.

Turning now to FIG. 6, a computer system 600 for LREG flush recovery is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 600, therefore, may include a general-purpose computer or mainframe 601 capable of running multiple instances of an O/S simultaneously.

In an exemplary embodiment, in terms of hardware architecture, as shown in FIG. 6, the computer 601 includes one or more processors 605, memory 610 coupled to a memory controller 615, and one or more input and/or output (I/O) devices 640, 645 (or peripherals) that are communicatively coupled via a local input/output controller 635. The input/output controller 635 can be, for example, but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 635 may include a plurality of sub-channels configured to access the output devices 640 and 645. The sub-channels may include fiber-optic communications ports.

The processor 605 is a hardware device for executing software, particularly that stored in storage 620, such as cache storage, or memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another but can be accessed by the processor 605.

The instructions in memory 610 may include one or more separate programs, each of which comprises an ordered listing of executable instructions for implementing logical functions. In the example of FIG. 6, the instructions in the memory 610 a suitable operating system (OS) 611. The operating system 611 essentially controls the execution of other computer programs and provides scheduling, input-output control, file and data management, memory management, and communication control and related services.

The memory 610 may include multiple logical partitions (LPARs) 612, each running an instance of an operating system. The LPARs 612 may be managed by a hypervisor, which may be a program stored in memory 610 and executed by the processor 605.

In an exemplary embodiment, a conventional keyboard 650 and mouse 655 can be coupled to the input/output controller 635. Other output devices such as the I/O devices 640, 645 may include input devices, for example, but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute instructions stored within the memory 610, to communicate data to and from the memory 610, and to generally control operations of the computer 601 pursuant to the instructions.

In an exemplary embodiment, the methods described herein can be implemented with any or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was

What is claimed is:

1. A method comprising:
receiving a flush request at a processing unit, the processing unit in a current state defined by contents of registers in a register file, the processing unit comprising a plurality of slices, each of the plurality of slices comprising an execution unit, and the flush request including an identifier of a previously issued instruction; and
restoring the processing unit to a previous state defined by contents of the registers in the register file prior to the previously issued instruction being issued, the restoring comprising:
searching previous state buffers in at least two of the plurality of slices to locate data describing the contents of the registers in the register file prior to the previously issued instruction being issued;
combining the located data to generate results of the searching, wherein a first portion of the located data is received from one of the at least two of the plurality of slices via a first data path and a second portion of the located data is received from another of the at least two of the plurality of slices via a second data path different than the first data path; and
updating the contents of the registers in the register file based at least in part on the results, the updating via a single port into the register file, thereby allowing the single port into the register file to be shared between the at least two of the plurality of slices.

2. The method of claim 1, wherein the processing unit is operating in single-thread mode.

3. The method of claim 1, wherein the processing unit is operating in multi-thread mode.

4. The method of claim 1, wherein the combining is performed using a multiplexor.

5. The method of claim 1, wherein contents of at least one of the state buffers is updated in response to an instruction being dispatched to an issue queue.

6. The method of claim 1, wherein dispatching of new instructions to the issue queue is halted during the restoring.

7. The method of claim 1, wherein the previous state buffers are broken up into quadrants and contents of the previous state buffers are spread across the quadrants.

8. The method of claim 1, wherein the processing unit comprises four slices.

9. A system comprising:
a memory having computer readable instructions; and
one or more processors for executing the computer readable instructions, the computer readable instructions controlling the one or more processors to perform operations comprising:
receiving a flush request at a processing unit, the processing unit in a current state defined by contents of registers in a register file, the processing unit comprising a plurality of slices, each of the plurality or slices comprising an execution unit, and the flush request including an identifier of a previously issued instruction; and
restoring the processing unit to a previous state defined by contents of the registers in the register file prior to the previously issued instruction being issued, the restoring comprising:
searching previous state buffers in at least two of the plurality of slices to locate data describing the contents of the registers in the register file prior to the previously issued instruction being issued;
combining the located data to generate results of the searching, wherein a first portion of the located data is received from one of the at least two of the plurality of slices via a first data path and a second portion of the located data is received from another of the at least two of the plurality of slices via a second data path different than the first data path; and
updating the contents of the registers in the register file based at least in part on the results, the updating via a single port into the register file, thereby allowing the single port into the register file to be shared between the at least two of the plurality of slices.

10. The system of claim 9, wherein the processing unit is operating in single-thread mode.

11. The system of claim 9, wherein the processing unit is operating in multi-thread mode.

12. The system of claim 9, wherein the combining is performed using a multiplexor.

13. The system of claim 9, wherein contents of at least one of the state buffers is updated in response to an instruction being dispatched to an issue queue.

14. The system of claim 9, wherein dispatching of new instructions to the issue queue is halted during the restoring.

15. The system of claim 9, wherein the previous state buffers are broken up into quadrants and contents of the previous state buffers are spread across the quadrants.

16. The system of claim 9, wherein the processing unit comprises four slices.

17. A computer program product comprising a computer readable storage medium having program instructions embodied therewith, the program instructions executable by a processor to cause the processor to perform operations comprising:
receiving a flush request at a processing unit, the processing unit in a current state defined by contents of registers in a register file, the processing unit comprising a plurality of slices, each of the plurality of slices comprising an execution unit, and the flush request including an identifier of a previously issued instruction; and
restoring the processing unit to a previous state defined by contents of the registers in the register file prior to the previously issued instruction being issued, the restoring comprising:
searching previous state buffers in at least two of the plurality of slices to locate data describing the contents of the registers in the register file prior to the previously issued instruction being issued;
combining the located data to generate results of the searching, wherein a first portion of the located data is received from one of the at least two of the plurality of slices via a first data path and a second portion of the located data is received from another of the at least two of the plurality of slices via a second data path different than the first data path; and
updating the contents of the registers in the register file based at least in part on the results, the updating via a single port into the register file, thereby allowing the single port into the register file to be shared between the at least two of the plurality of slices.

18. The computer program product of claim 17, wherein contents of at least one of the state buffers is updated in response to an instruction being dispatched to an issue queue.

19. The computer program product of claim 17, wherein dispatching of new instructions to the issue queue is halted during the restoring.

20. The computer program product of claim 17, wherein the previous state buffers are broken up into quadrants and contents of the previous state buffers are spread across the quadrants.

* * * * *